United States Patent
Kim et al.

(10) Patent No.: US 9,995,268 B2
(45) Date of Patent: Jun. 12, 2018

(54) WATER SURFACE FLOATING HIGH EFFICIENCY WATERWHEEL GENERATOR

(71) Applicants: Yu Il Kim, Daegu-si (KR); Seo Lim Kim, Daegu-si (KR)

(72) Inventors: Yu Il Kim, Daegu-si (KR); Seo Lim Kim, Daegu-si (KR)

(*) Notice: Subject to any disclaimer, the term of this patent is extended or adjusted under 35 U.S.C. 154(b) by 80 days.

(21) Appl. No.: 14/912,596

(22) PCT Filed: Aug. 21, 2014

(86) PCT No.: PCT/KR2014/007743
§ 371 (c)(1),
(2) Date: Feb. 17, 2016

(87) PCT Pub. No.: WO2015/129974
PCT Pub. Date: Sep. 3, 2015

(65) Prior Publication Data
US 2016/0208765 A1 Jul. 21, 2016

(30) Foreign Application Priority Data
Feb. 26, 2014 (KR) .................. 10-2014-0022382

(51) Int. Cl.
*F03B 13/00* (2006.01)
*F03B 17/06* (2006.01)
(Continued)

(52) U.S. Cl.
CPC .............. *F03B 13/00* (2013.01); *B63B 35/44* (2013.01); *F03B 7/00* (2013.01); *F03B 17/063* (2013.01);
(Continued)

(58) Field of Classification Search
CPC .......... F03B 13/00; F03B 7/00; F03B 17/063; F03D 9/008; B63B 35/44;
(Continued)

(56) References Cited

U.S. PATENT DOCUMENTS 4,023,041 A * 5/1977 Chappell ............... F03B 13/184
290/42
4,757,777 A * 7/1988 Rosenberger .......... B63B 1/125
114/102.32

(Continued)

FOREIGN PATENT DOCUMENTS

KR 10-2006-0015898 A 2/2006
KR 10-2010-0001454 A 1/2010
(Continued)

*Primary Examiner* — Pedro J Cuevas
*Assistant Examiner* — Joseph Ortega
(74) *Attorney, Agent, or Firm* — Im IP Law; C. Andrew Im

(57) ABSTRACT

A waterwheel generator providing a high efficiency rotational movement and floating on the surface of the water to generate power according to a water flow. A buoyant installation frame is filled with a predetermined amount of buoyant medium. A waterwheel rotational blade unit includes a plurality of rotational blades attached around a rotational shaft in a waterwheel receiving hole and immersed in a predetermined depth of water. The waterwheel receiving hole is formed at one side of the buoyant installation frame and exposed to water having a predetermined flowing speed. Height adjustment means is arranged at both ends of the rotational shaft to adjusts its height. Wire hooking means is configured around the outer periphery of the buoyant installation frame to prevent the buoyant installation frame from being carried away by the flow of water. A generator is provided at one side of the rotational shaft.

19 Claims, 12 Drawing Sheets

(51) Int. Cl.
 *F03B 7/00* (2006.01)
 *B63B 35/44* (2006.01)
 *F03D 9/00* (2016.01)

(52) U.S. Cl.
 CPC ...... *F03D 9/008* (2013.01); *B63B 2035/4466* (2013.01); *F05B 2240/40* (2013.01); *F05B 2240/93* (2013.01); *F05B 2260/4031* (2013.01); *F05B 2270/101* (2013.01); *Y02E 10/28* (2013.01); *Y02E 10/72* (2013.01)

(58) Field of Classification Search
 CPC ......... B63B 2035/4466; F05B 2240/40; F05B 2240/93; F05B 2260/4031; F05B 2270/101; Y02E 10/28; Y02E 10/72
 See application file for complete search history.

(56) References Cited

U.S. PATENT DOCUMENTS

| | | | | |
|---|---|---|---|---|
| 4,877,524 | A * | 10/1989 | Eberhardt | C02F 1/66 144/264 |
| 5,025,747 | A * | 6/1991 | Grayson | B63B 27/14 114/343 |
| 7,841,289 | B1 * | 11/2010 | Schanz | B63B 25/08 114/256 |
| 2007/0062428 | A1 * | 3/2007 | Eveleth | B63B 1/125 114/39.31 |
| 2007/0169680 | A1 * | 7/2007 | Kim | B63B 7/08 114/345 |
| 2009/0134623 | A1 * | 5/2009 | Krouse | F03B 13/08 290/43 |
| 2009/0322093 | A1 * | 12/2009 | Winius | F03B 17/063 290/54 |
| 2010/0237625 | A1 * | 9/2010 | Dempster | F03B 7/00 290/54 |
| 2011/0256518 | A1 * | 10/2011 | Rott | A63B 69/0093 434/247 |
| 2011/0259440 | A1 * | 10/2011 | Kawashima | B63B 1/38 137/234.6 |
| 2012/0032444 | A1 * | 2/2012 | Burton | F03B 13/145 290/53 |
| 2014/0174332 | A1 * | 6/2014 | Knight | B63B 3/08 114/263 |
| 2014/0322996 | A1 * | 10/2014 | Nakamura | F03B 13/16 440/8 |
| 2015/0210362 | A1 * | 7/2015 | Ruiz Diez | B63B 35/44 114/61.1 |

FOREIGN PATENT DOCUMENTS

| | | | |
|---|---|---|---|
| KR | 10-2011-0068118 A | 6/2011 | |
| KR | 10-2012-0030291 A | 3/2012 | |
| KR | 10-2013-0030346 A | 3/2013 | |
| KR | 20130030346 | * 3/2013 | ............. F03B 17/02 |

* cited by examiner

[Fig. 1]
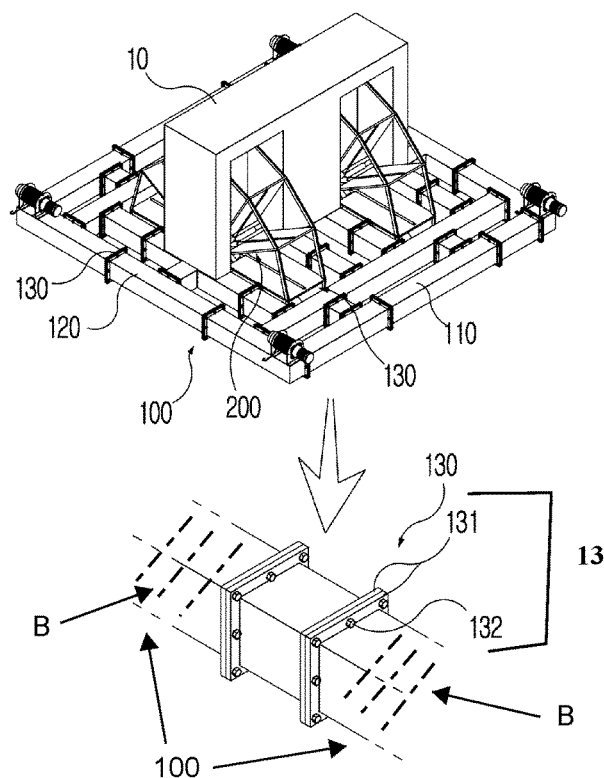
[Fig. 2]
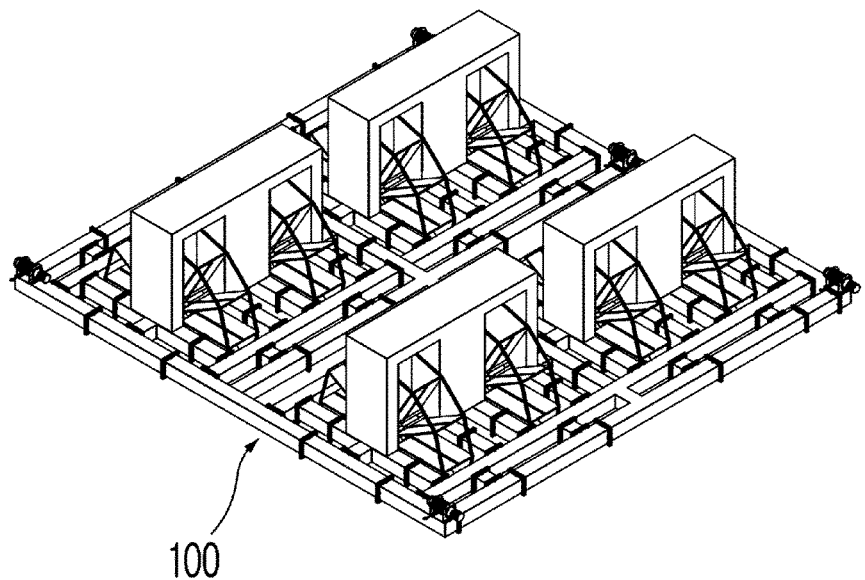

[Fig. 3]
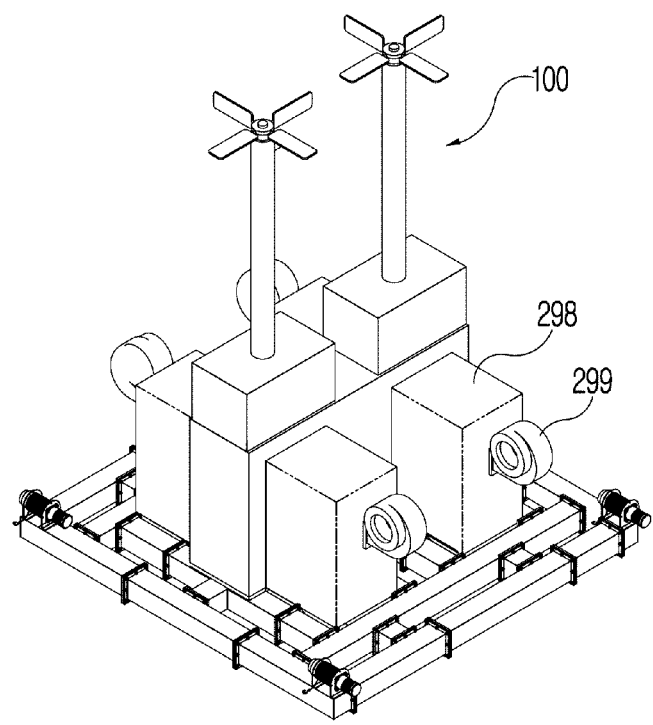

[Fig. 4]
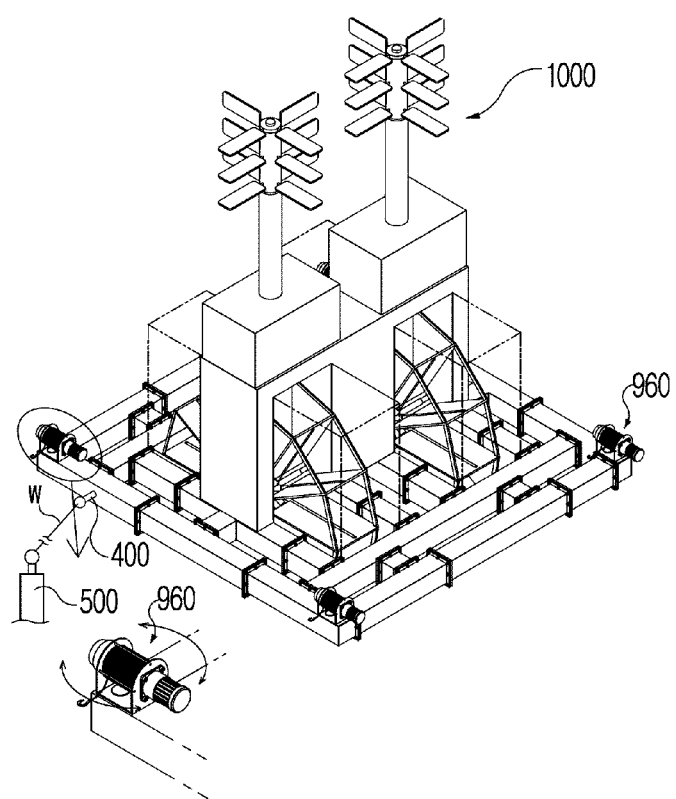

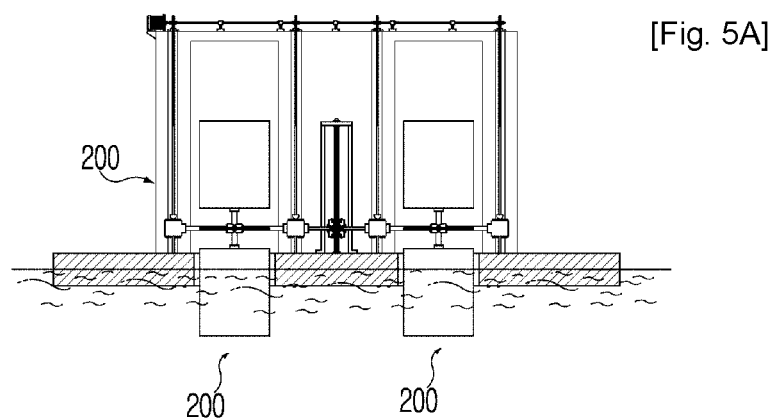
[Fig. 5A]
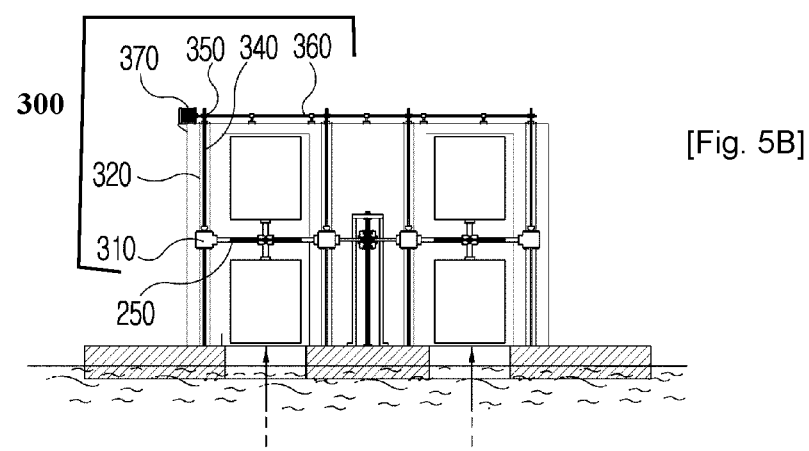
[Fig. 5B]

[Fig. 6]
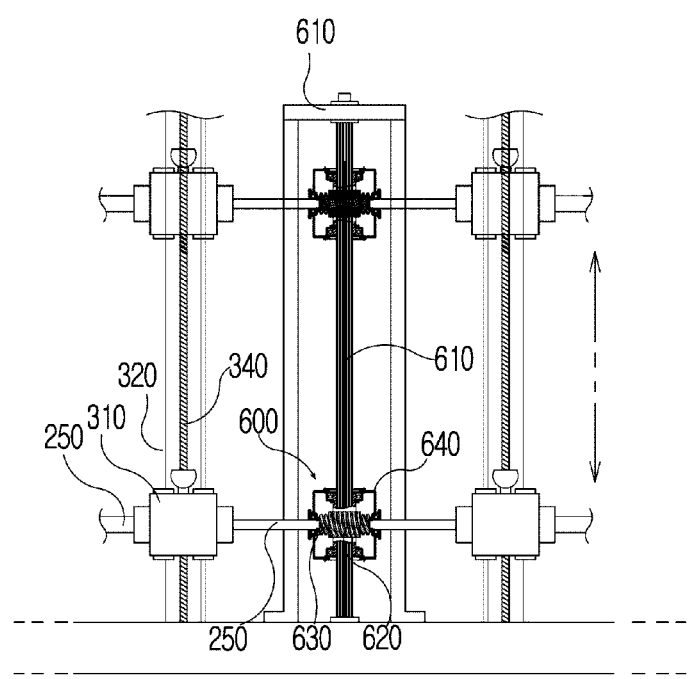

[Fig. 7]
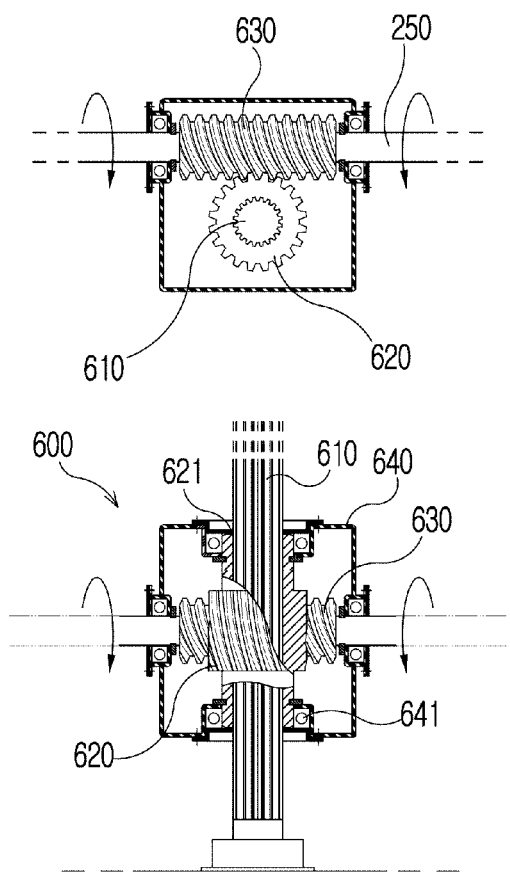

[Fig. 8]
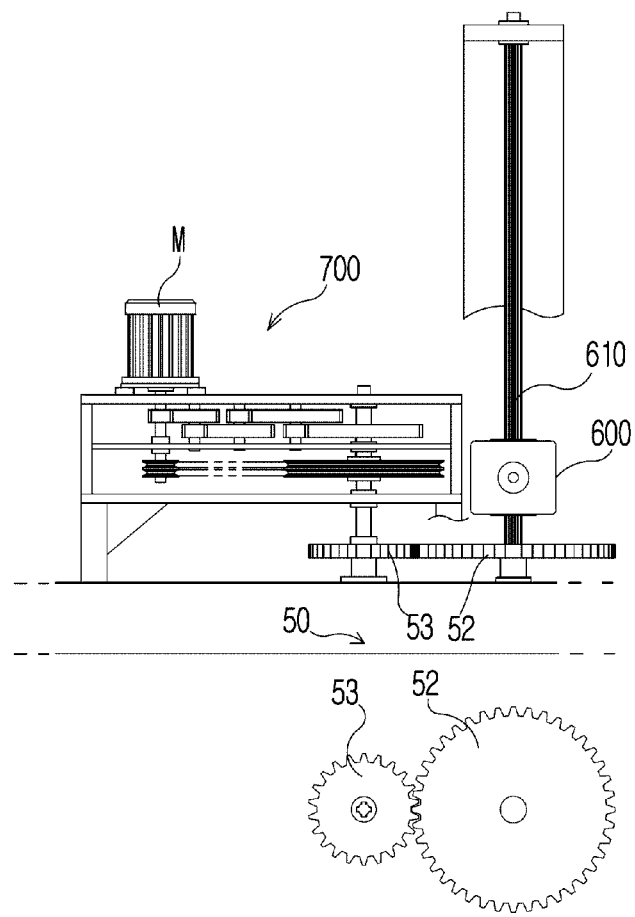

[Fig. 9]
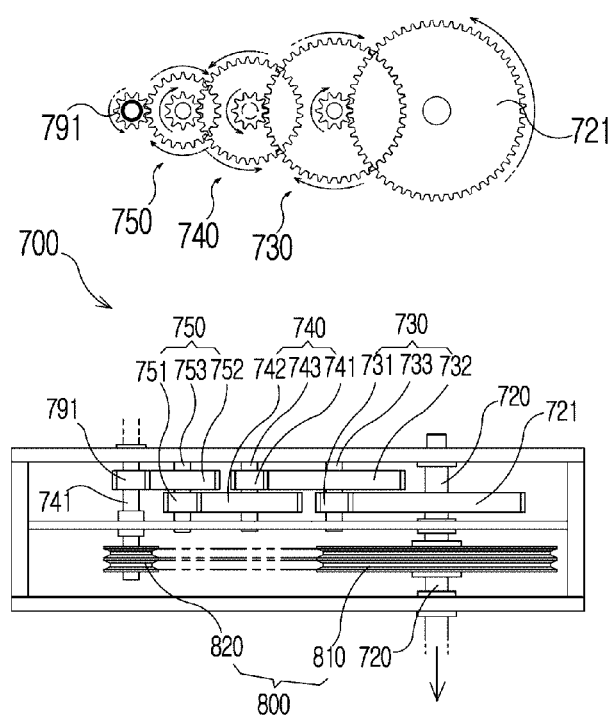

[Fig. 10]
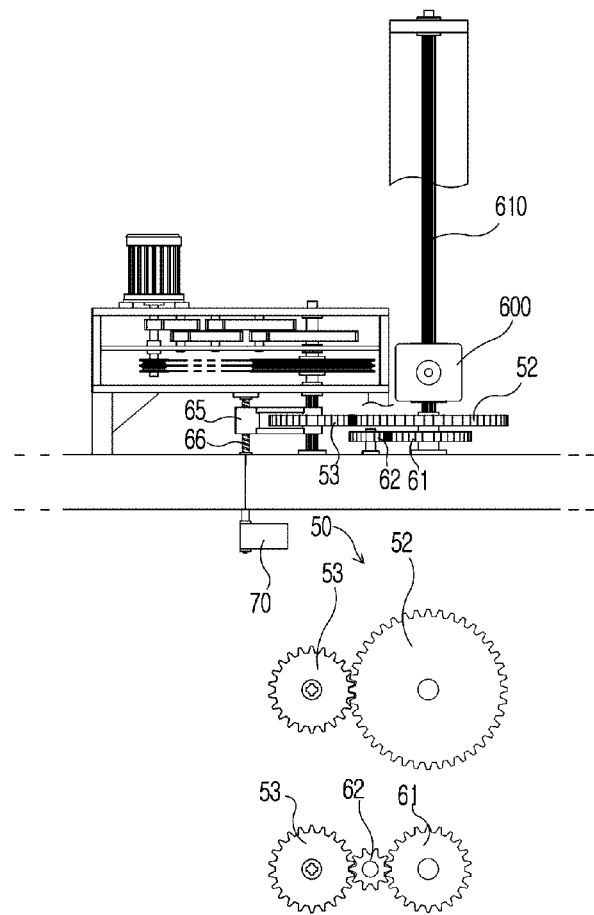

[Fig. 11A]
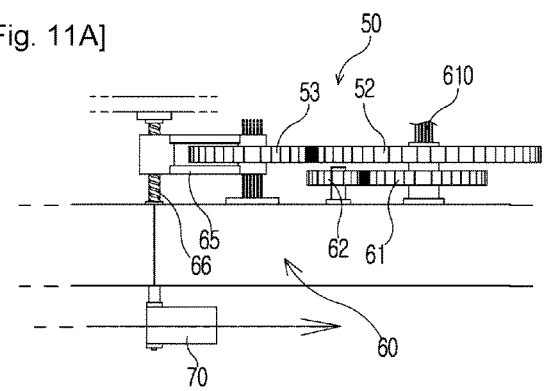
[Fig. 11B]
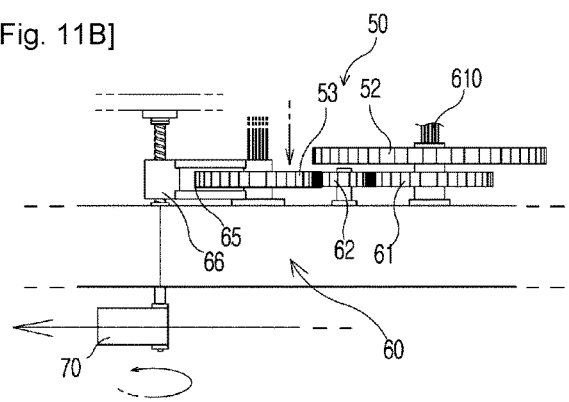
[Fig. 12]
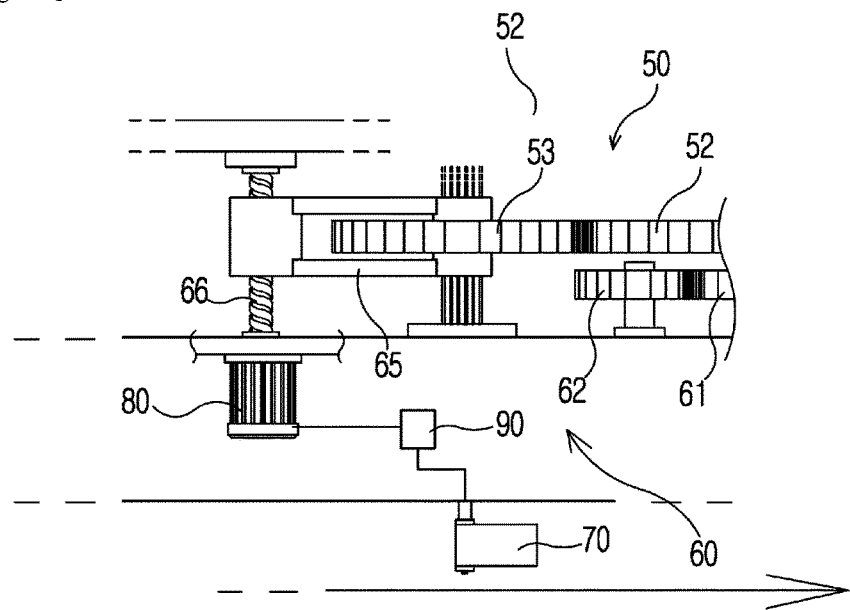

[Fig. 13]
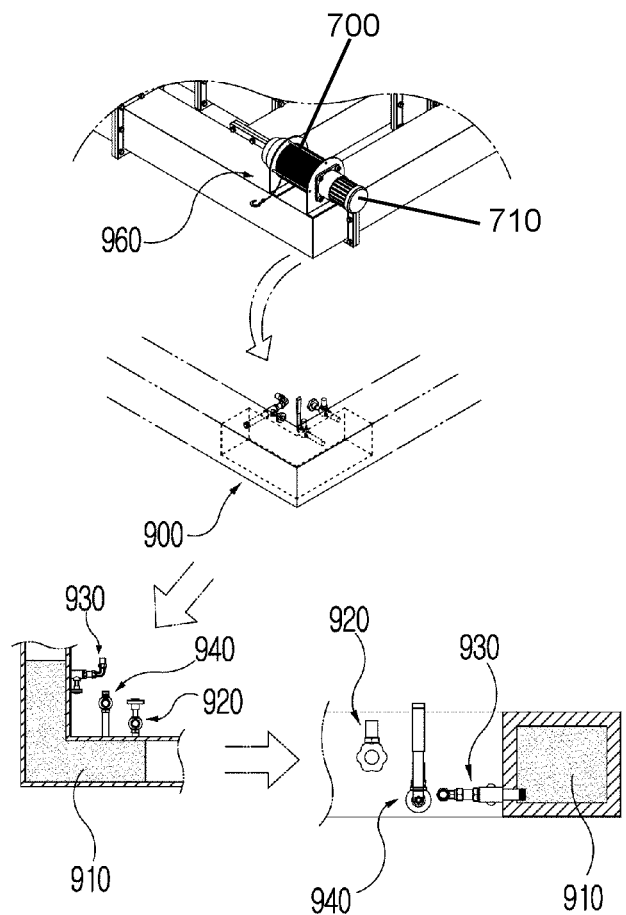

[Fig. 14]
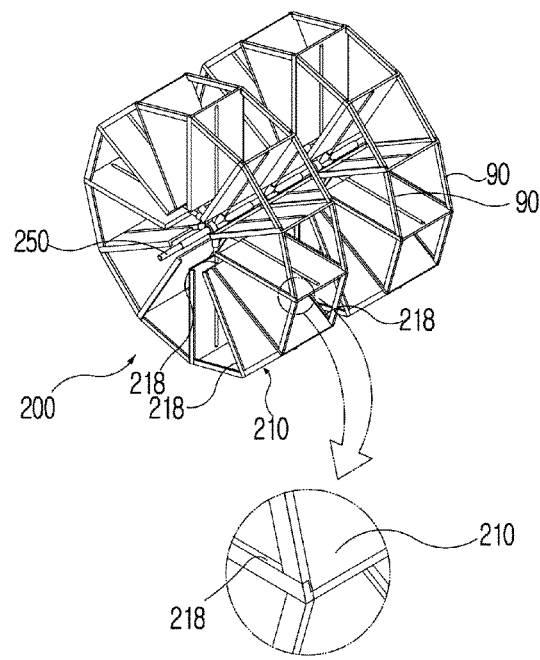
[Fig. 15]
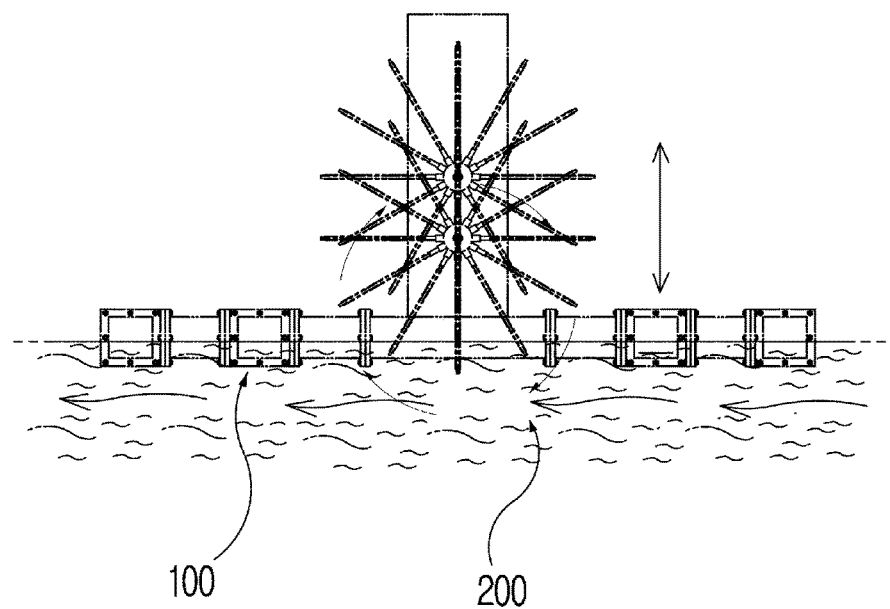

WATER SURFACE FLOATING HIGH EFFICIENCY WATERWHEEL GENERATOR

TECHNICAL FIELD

The present invention relates to a waterwheel generator capable of high efficiency power generation by a rotational movement of a waterwheel attributable to a water current in water, such as the sea or a river having a specific water current (a flow of water), in a floating state on the surface of the water.

BACKGROUND ART

In general, wind power generation, solar energy generation, etc. in addition to waterpower generation, tidal power generation, thermal power generation, and nuclear power generation are used as a method for producing electricity. From among them, thermal power generation and nuclear power generation equipment are problematic in that they require massive consumption energy, an advanced technology, manpower, expensive advanced equipment, etc. for an operation and require a very high installation cost and maintenance cost, etc. and they have an adverse effect in which a large number of pollutants harmful to an environment is generated.

Accordingly, recently, there is a great interest in the development of low carbon green energy using wind power, sunlight, a water current, and a tidal current.

Meanwhile, the water current may include a tidal current attributable to the tide of the coast of the sea, an ocean current strongly flowing in any one direction, such as river water, in the sea, the velocity of a moving fluid in a large or small river in the entire region of Korea, etc.

A conventional tidal power generation apparatus is described in brief below. Most of conventional tidal power generation apparatuses have complicated structures and require very high installation costs. In particular, the structure of a rotation apparatus stands in a vertical direction corresponding to a flow of a water current like the blades of a common electric fan, and a plurality of blades forming the rotation apparatus are configured at a tilt angle. Accordingly, there were problems in that rotary power of a rotational blade device and a maximum energy supply and demand rate when a power generation rate is changed with respect to water current kinetic energy of a constant flow of water are not satisfied, investment versus power generation efficiency according to a cost and installation is not high because a constant offset value is present, and thus more rotational blade devices need to be installed and installation spaces therefor are required.

Furthermore, a conventional water current generator is installed to be fixed to any point of a river accompanied by a flow of water. If river water rises or reduces greatly due to a flood, drought or the like, there is a problem in terms of a high cost and management because the position of the conventional water current generator must be adjusted in accordance with a water level of the river water using massive technicians and equipment.

In particular, a heavy and large post (or tower) must be installed up to a very high height from the bottom of a river or the sea to the surface of the water for installation and fixing. Accordingly, there was a problem in that a very high cost and a massive construction volume are required for facilities for installation and fixing if the depth of river water or the sea is large.

DISCLOSURE

Technical Problem

An object of the present invention is to provide a high-efficiency water current generator, which provides a waterwheel having a simple and cheap cost and rotatable in response to a flow of a water current in the state in which the waterwheel floats on the water, provides means capable of artificially controlling the high and low of the waterwheel if a check, failure, and repair are required or depending on a varying water level, has simpler and more easy installation and convenience of a change of the place (movement), and is further convenient even in the operation, maintenance, and management of a structure and apparatus.

Technical Solution

The present invention for achieving the object includes a buoyant installation frame 100 in which a specific amount of a buoyant medium B is filled in such a way as to float on the water (a buoyancy operation); a waterwheel type rotational blade unit 200 in which waterwheel installation grooves 130 exposed to a water current are formed in any one or more places within the buoyant installation frame 100 and a plurality of rotational blades 210 is attached to the waterwheel installation grooves 130 around a rotational shaft 250, a portion of the lower side of each of the plurality of rotational blades 210 is submerged in the water of a specific depth; height adjustment means 300 capable of adjusting the height of the rotational shaft 250 including the waterwheel type rotational blade unit 200 on both sides of the rotational shaft 250 including the waterwheel type rotational blade unit 200; wire hooking means 400 which is configured in the outer circumference of the buoyant installation frame 100 and can fix the buoyant installation frame 100 in order to prevent the buoyant installation frame 100 from being carried away by a flow of water using a wire W; and a generator M which is provided on one side of the rotational shaft 250 and which can receive rotation power of the waterwheel type rotational blade unit 200 rotated by the water current and convert the rotation power into electric energy.

Advantageous Effects

In the high-efficiency water current generator which may be configured as above according to the present invention, the rotational blade device rotated by a water current (a tidal current of the sea, a flow of water in a river or the like) is configured in a waterwheel type, and the waterwheel type rotational blade unit of the rotational blade device is installed within the buoyant installation frame that is buoyant on the surface of the water by self-buoyancy. Accordingly, instant and active measures are possible although a water level is changed (rises or falls), a structure is simple, maintenance and management are convenient, convenience in which the high-efficiency water current generator can be easily moved by pulling or pushing it using a boat for traction can be provided although the installation place is changed, if necessary. In particular, the high-efficiency water current generator is a useful invention having a significant advantage in terms of a very low cost and apparatus compared to an existing generator when the high-efficiency water current generator is installed on the sea or the water of a river having a high water depth.

DESCRIPTION OF DRAWINGS

FIG. 1 is a perspective view showing a preferred embodiment of the present invention.

FIGS. 2 to 4 are exemplary diagrams showing the state in which an application of the present invention is implemented.

FIG. 5 is a front cross-sectional view showing a preferred embodiment of the present invention.

FIG. 6 is an exemplary diagram of a partial enlarged cross-sectional view showing the state in which the operation of a generator according to the present invention is implemented.

FIG. 7 is a cross-sectional exemplary diagram showing the state in which a preferred operation of primary rotation power transfer means according to the present invention is implemented.

FIG. 8 is an exemplary diagram showing the installation of secondary rotation power transfer means according to the present invention.

FIG. 9 is a detailed diagram of a speed increase device of the present invention.

FIGS. 10 to 12 are exemplary diagrams showing a rotational direction automatic conversion device of the present invention.

FIG. 13 is an enlarged exemplary diagram showing an air type balance control device of the present invention.

FIG. 14 is an enlarged view showing a preferred embodiment of a rotational blade unit according to the present invention.

FIG. 15 is a side exemplary diagram showing an embodiment of the present invention.

MODE FOR INVENTION

A waterwheel type high-efficiency water current generator of the present invention is described in detail below with reference to the accompanying drawings.

The present invention has a characteristic gist, including
 a buoyant installation frame 100 which is filled with a specific amount of a buoyant medium B (a material capable of a specific buoyancy operation on the water, such as air, a gas, or Styrofoam) and capable of floating on the water (a buoyancy operation);
 waterwheel installation grooves 130 which is perforated in any one or more points of the buoyant installation frame 100 and exposed to a water current;
 a rotational blade unit 200 which is installed in the waterwheel installation grooves 130 and to which a plurality of rotational blades 210 is attached around a rotational shaft 250;
 height adjustment means 300 which is installed between upper frames placed at a specific height on both sides of the rotational blade unit 200 and capable of artificially controlling an top and bottom height of the rotational blade unit 200;
 wire hooking means 400, a wire W, and a fixing anchor 500 which are installed in the outer circumference of the buoyant installation frame 100, at a bottom surface under the surface of the water, and between the outer circumference and the bottom surface and which holds the buoyant installation frame 100 in order to prevent the buoyant installation frame 100 from being carried away by a flow of water; and
 a generator M which is installed on one side of the rotational shaft 250 and which may receive rotation power of the waterwheel type rotational blade unit 200 rotated by a water current and convert the rotation power into electric energy.

The buoyant installation frame 100 is configured to form a buoyant body having a specific width by fabricating a plurality of horizontal frame pieces 110 and a plurality of vertical frame pieces 120 each having buoyant medium filling chambers 111 and 112 so that the buoyant medium filling chamber is filled with a specific amount of the buoyant medium B (a material capable of a specific buoyancy operation on the water, such as air, a gas, or Styrofoam) and then disposing the plurality of horizontal frame pieces 110 and a plurality of vertical frame pieces 120 in such a way as to cross each other in a horizontal or vertical direction.

A flange assembly unit 13 to which two flanges 131 are closely attached and which has been fixed by a plurality of bolts 132 is configured in a connection part between the horizontal frame pieces 110, a connection part between the vertical frame pieces 120, and a connection part between the horizontal frame piece 110 and the plurality of vertical frame piece 120 having different directions. Accordingly, carry and handling and installation on the surface of the water are very convenient, and disassembly is very convenient.

The rotational shaft 250 having a specific length and diameter is configured at the central portion of the waterwheel type rotational blade unit 200, and the plurality of rotational blades 210 each having a force-of-flowing-water resistance surface 210 which may be subjected to maximum force-of-flowing-water resistance of a water current is configured at a specific angle interval outside the rotational shaft 250. Since a portion of the bottom of the rotational shaft 250 is submerged in the water having a specific velocity of a moving fluid, the rotational shaft 250 can be rotated by a great resistance force when the force-of-flowing-water resistance of the specific velocity of a moving fluid is applied to the rotational blade of the submerged portion.

In this case, if a single waterwheel type rotational blade unit 200 is configured in a single waterwheel installation groove 130, the rotational shaft 250 installed at the central portion of the waterwheel type rotational blade unit 200 has only to be configured in a short length corresponding to the width of the single waterwheel type rotational blade unit 200. If another waterwheel installation groove 130 is formed on the other side adjacent to the waterwheel installation grooves 130 and another waterwheel type rotational blade unit 200 is installed in another waterwheel installation groove 130, the rotational shaft 250 may preferably be formed in a long length capable of accommodating the two waterwheel type rotational blade units 200 at once without a need to configure the two waterwheel type rotational blade units 200 separately.

Furthermore, auxiliary resistance pieces 218 which can certainly prevent a loss of force-of-flowing-water resistance so that force-of-flowing-water resistance of a water current can be greatly influenced when it affects the blade and which is bent 90 degrees in order to maximize efficiency of power generation may be further formed selectively in three sides including the right and left sides and inside of the force-of-flowing-water resistance surface of the wide rotational blade formed in the waterwheel type rotational blade unit 200 other than the outside of the force-of-flowing-water resistance surface.

Furthermore, a reinforcement pole 219 having a specific strength and support force may further installed between the plurality of rotational blades 210 of the waterwheel type rotational blade unit 200 in order to prevent bending or damage attributable to a great load and the accumulation of the load in the process of the rotational blade being rotated by the force of flowing water.

Meanwhile, the height adjustment means 300 may be designed to include one or more guide poles 320 configured in the buoyant installation frame 100 on both sides of the rotational shaft 250 of the waterwheel type rotational blade unit 200 and configured to lengthily stand at the height of the upper frame, an up/down slide block 310 configured in the guide pole 320 and to be capable of sliding up and down along the guide pole 320 in the state in which the up/down slide block 310 has been connected to the left and right sides of the rotational shaft 250, a screw pole 340 configured to penetrate each of the up/down slide blocks 310 from a top surface of the buoyant installation frame 100 to the upper frame 10, a rotational direction switching member 350 configured to include a screw binding groove 351 engaged with the screw pole 340 and a worm wheel 352 outside the screw binding groove 351 in the upper frame 10 over the screw pole 340, 340-1, a driving shaft 360 configured to include a worm gear 361 capable of sending and receiving motive power to and from the worm wheel 352 in a direction crossing the rotational direction switching member 350, and a driving servo motor 370 installed to be capable of forward and reverse rotation on any one side of the driving shaft 360.

In this case, the worm wheel 352 and the worm gear 361 are for changing rotator power to the direction of 90° and may be replaced with a bevel gear, a 45°-tilted helical gear or the like, if necessary. The worm wheel 352 and the worm gear 361 are for artificially controlling the top and bottom height of the waterwheel type rotational blade unit 200 including the rotational shaft 250 and the rotational blades 210 if there is a possibility that the rotational blade may come in contact with the bottom surface because a water level is reduced, if it is necessary to control force-of-flowing-water resistance affecting the rotational blade in order to set desired rotational speed, or if a rotation device is required for failure, repair or check purposes.

That is, if the revolutions per minute (RPM) of the waterwheel type rotational blade unit 200 is great compared to a power generation capacity allocated to the generator M, which is a cause that increases the velocity of the water, force-of-flowing-water resistance applied to the waterwheel type rotational blade unit 200 needs to be reduced. In this case, it is necessary to increase the waterwheel type rotational blade unit 200 by raising it up.

In contrast, if the revolutions per minute (RPM) of the waterwheel type rotational blade unit 200 is small compared to a power generation capacity allocated to the generator, which is a cause that decreases the velocity of the water, the force-of-flowing-water resistance applied to the waterwheel type rotational blade unit 200 needs to be increased. In this case, the position of the waterwheel type rotational blade unit 200 (the amount that the waterwheel type rotational blade unit 200 has been submerged in the water) needs to be reduced that much.

Furthermore, the height adjustment means 300 is necessary for the aforementioned purposes, but may be used very usefully because the height of the rotational blade unit 200 needs to be increased if there is a possibility that the rotated rotational blade unit 200 may come in contact with the bottom of the water due to a reduction of a water level attributable to drought, etc.

Furthermore, the generator M is an element for producing electricity using rotation power received from the waterwheel type rotational blade unit 200 rotated by a water current in the state in which the generator has been installed on one side of the rotational shaft 250.

The generator M may be installed at any place where rotation power from the waterwheel type rotational blade unit 200 can be easily delivered to the generator, and the waterwheel type rotational blade unit 200 can be moved up and down (height is adjusted) at a specific height along with the rotational shaft 250 by the height adjustment means 300.

Although the rotational shaft 250 moves up and down, separate primary rotation power transfer means 600 capable of stably transferring rotation power is further required. Furthermore, separate speed increase device 700 for changing the low speed rotation of the waterwheel type rotational blade unit 200 to high speed rotation for the generator M needs to be further configured between the primary rotation power transfer means 600 and the generator M.

The primary rotation power transfer means 600 includes
a spline shaft 610 configured to have a length longer than the top and bottom height adjustment section of the waterwheel type rotational blade unit 200 and configured at the top of the buoyant installation frame 100 at a point at which the spline shaft 610 intersects the rotational shaft 250 in the state in which the spline shaft 610 has been supported between upper fixing support plates 20 by a bearing, an up/down moving type helical gear 620 configured to have a spline groove 621 formed therein in such a way as to be able to move up and down in the state in which the up/down moving type helical gear 620 has been engaged with the spline shaft 610 at a point of the spline shaft 610 at which the up/down moving type helical gear 620 intersects the rotational shaft 250, a shaft fixing type helical gear 630 engaged with the rotational shaft 250 intersecting the up/down moving type helical gear 620 at a tilt angle of 45° and configured to change rotation 90°, and a gear box 640 configured in the circumference of the up/down moving type helical gear 620 and the shaft fixing type helical gear 630 and supported by bearings 641 so that rotation power can be easily transferred along with the up and down movements of the rotational shaft 250.

Furthermore, a secondary rotation power transfer device 50 for connecting rotation power of the spline shaft 610 to the speed increase device 700 is configured between the spline shaft 610 rotated by the primary rotation power transfer means 600 and the speed increase device 700 as shown in FIG. 8.

The secondary rotation power transfer device 50 includes one-side gear 52 and the other-side gear 53 configured in the rotational input-side shaft 720 disposed on the lower side of the speed increase device 700 and the spline shaft 610, respectively, so that the teeth of one-side gear 52 and the other-side gear 53 are engaged with each other.

Accordingly, rotatory power of the spline shaft 610 rotated by the primary rotation power transfer means 600 can be easily transferred to the speed increase device 700 spaced apart from the spline shaft 610 at a specific interval.

However, the secondary rotation power transfer means 50 simply transfers the rotation of the spline shaft 610 in the same direction. If the rotation direction of a transferred driving force needs to be selectively changed to forward rotation or reverse rotation, a control operation for the change of the rotation direction is impossible. Accordingly, a rotational direction automatic conversion device 60 capable of automatically changing rotation power to forward rotation or reverse rotation in a required direction in which the rotation power is transferred (or connected) is further installed on one side of the secondary rotation power transfer means 50. Although a flow of a water current is suddenly changed, such as the flowing tide and ebb tide of the coast of the sea, rotation power transferred toward the subsequent speed increase device and generator M may preferably be always transferred in one direction for the generator.

In this case, the rotational direction automatic conversion device 60 may be designed to include a conversion gear 61 configured under the spline shaft 610 into which the one-side gear 52 of the secondary rotation power transfer means 50 has been inserted, an idle gear 62 configured to have its teeth engaged with the teeth of the conversion gear 61, and a gear moving link member 65 disposed in the one-side gear 52 of the secondary rotation power transfer means 50 and configured to selectively control a transferred rotation direction to forward rotation or reverse rotation when the teeth of the gear moving link member 65 are engaged with the teeth of the other-side gear 53 while the gear moving link member 65 operates up and down at a specific interval in response to a movement of a water current direction indicator 70 (an element for checking the direction of a water current while the indicator moves in response to a flow of the water current) or when the teeth of the gear moving link member 65 are engaged with the teeth of the idle gear 62 disposed on the lower side of the other-side gear 53. The water current direction indicator 70 has been installed to have a screw 66 penetrate the water current direction indicator 70 up and down at the back of the gear moving link member 65 and to enable the direction of a water current to be checked while moving in response to a flow of the water current at the bottom of the frame (the position exposed to the water current) in the state in which the water current direction indicator 70 has been connected to the axis of the screw 66.

In this case, a driving control unit 90 for realizing the operations of a small-sized driving motor 80 and the screw 66 when the direction of the water current direction indicator 70 is detected and the direction signal is transferred to the driving motor 80 may be directly coupled between the water current direction indicator 70 and the screw 66 by a shaft, but if necessary, the driving motor 80 may be configured under the screw 66 and the driving control unit 90 may be then disposed between the driving motor 80 and the water current direction indicator 70.

In this case, if the rotational direction automatic conversion device 60 is installed, the other-side gear 53 may have its teeth engaged with those of the one-side gear 52 while moving up and down when the rotational direction automatic conversion device 60 operates, but if necessary, when the other-side gear 53 has its teeth engaged with those of the idle gear 62 under the other-side gear 53 has, a rotation direction applied to the speed increase device 700 and the generator M can be maintained always constantly although an input rotation direction is changed depending on the direction of a water current.

As a result, if the rotational direction automatic conversion device 60 is installed, the other-side gear 53 is configured to move up and down in response to the operation of the rotational direction automatic conversion device 60 and simultaneously to have its teeth engagement with the one-side gear 52 or the idle gear 62 controlled while automatically changing its position.

Furthermore, the speed increase device 700 is means for receiving rotation power from the rotational connection gear unit 701 when the spline shaft 610 is rotated by the primary rotation power transfer means 600 and increasing the rotation power at a high rotating speed ratio for the generator NI in order to enable easy power generation.

The rotational input-side shaft 720 is configured on the lower side of the speed increase device 700. The speed increase device 700 includes a rotational input large gear 721 of a specific size configured in the rotational input-side shaft 720, a first speed increase gear set 730 in which a passive small gear 731 having its teeth engaged with the teeth of the rotational input large gear 721 and a middle large gear 732 larger than the passive small gear 731 are inserted into a passive shaft 733 up and down is installed on one side of the rotational input large gear 721, a second speed increase gear set 740 in which a passive small gear 741 having its teeth engaged with the teeth of the middle large gear 732 and a middle large gear 742 larger than the passive small gear 741 are inserted into a passive shaft 743 up and down is installed on one side of the first speed increase gear set 730, a third speed increase gear set 750 in which a passive small gear 751 having its teeth engaged with the teeth of the middle large gear 742 and a middle large gear 752 larger than the passive small gear 751 are inserted into a passive shaft 753 up and down is installed on one side of the second speed increase gear set 740, and a speed increase output shaft 790 configured to have an output small gear 791 smaller than the middle large gear 752 and provided on one side at the back of the third speed increase gear set 750.

In this case, motive power rear transfer means 800 capable of solving the difficulty or impossibility of a movement itself for increasing speed due to a significant load applied when speed is increased and resistance thereof through a simple principle may be further installed between the top of the rotational input-side shaft 720 and the top of the speed increase output shaft 790.

The motive power rear transfer means 800 includes a rotational start-side pulley 810 configured at the top of the rotational input-side shaft 720, a speed increase load-side pulley 820 configured at the top of the speed increase output side 790, and a tackle bearing (not shown) which may be installed in a bicycle pedal wheel, etc. and is inserted into the speed increase load-side pulley 820.

First, the speed increase load-side pulley 820, the speed increase output shaft 790, and the output small gear 791 may be rotated at low speed by low-speed rotation transferred by the rotational start-side pulley 810, so a rotation movement started ahead is directly transferred to the rear. Accordingly, the present invention is a useful invention capable of greatly minimizing a movement load further increased when the first, the second, and the third speed increase gear sets 730, 740, and 750 are connected according to a speed increase and a load when a movement is started.

Furthermore, an air type balance control device 900 capable of very simply controlling the entire balance of the buoyant installation frame 100 which may be variously changed through the injection and discharge of air may be further installed in each of the four corner sides of the buoyant installation frame 100.

The air type balance control device 900 has only to be designed to include a balance control chamber 910 separately sealed within each of the four corner sides of the buoyant installation frame 100, an air pressure injection valve 920 configured over the balance control chamber 910 and to selectively fill or charge the balance control chamber 910 with air transferred from an air generator (not shown) to a hose, an air discharge valve 930 configured on the other side of the balance control chamber 910 to easily discharge air within the balance control chamber 910 to the outside, if necessary, and a water entrance/exit control valve 940 configured under the balance control chamber 910 and to receive water of mass corresponding to the discharged amount of air filled in the balance control chamber 910 so that the balance control chamber 910 becomes heavy and to discharge water within the balance control chamber 910 to the outside when high-pressure air is injected into the balance control chamber 910 through the air pressure injection valve 920 so that the balance control chamber 910 becomes light.

Furthermore, wires of a specific length may be densely wound on the rotary drum 700 at the top of the buoyant installation frame 100 (preferably the top of each of the four corner sides), a deceleration motor 710 may be configured on one side of the drum 700, and a plurality of heavy matter pulling circular floats 960 capable of pulling a plurality of heavy bodies using the wires may be further installed.

Furthermore, a wind power generator 1000 capable of additional power generation for reserved power using a wind in the coast of the sea or the riverside of a valley having a high air volume or wind speed compared to other areas may be separately installed at the top of the upper frame 10 in which the waterwheel type rotational blade unit 200 has been embedded.

The wind power generator applied in this case may adopt various forms if it has a structure capable of generating power of a specific capacity depending on an air volume without being limited to any one structure.

Furthermore, a rotational blade cover 298 may be installed in the outer circumference of the waterwheel type rotational blade unit 200 in order to protect the waterwheel type rotational blade unit 200. If heating means 299 capable of including a heater fan, a shot step, etc. is installed, if necessary, a smooth operation not having freezing can be guaranteed in a very cold area in which a glacier may be formed.

SEQUENCE LIST FREE TEXT

W: wire
100: buoyant installation frame
130: waterwheel installation groove
200: rotational blade unit
210: rotational blade
250: rotational shaft
300: height adjustment means
400: wire hooking means
500: fixing anchor

The invention claimed is:

1. A water surface floating type high-efficiency waterwheel generator, comprising:
   a buoyant installation frame filled with a predetermined amount of a buoyant medium of a predetermined buoyancy operation on the water such that the buoyant installation frame floats on the water;
   waterwheel installation grooves perforated in any one or more points of the buoyant installation frame and exposed to a water current;
   a waterwheel type rotational blade unit installed in the waterwheel installation grooves and comprising a plurality of rotational blades attached around a rotational shaft;
   a height adjuster installed between upper frames placed at a predetermined height on both sides of the rotational blade unit and configured to control top and bottom heights of the rotational blade unit;
   a wire hooking device, a wire and a fixing anchor, installed in an outer circumference of the buoyant installation frame, at a bottom surface under a surface of the water, and between the outer circumference and the bottom surface, are configured to hold the buoyant installation frame to prevent the buoyant installation frame from being carried away by the water current;
   a generator installed on one side of the rotational shaft and configured to receive a rotation power of the rotational blade unit rotated by the water current and to convert the rotation power into an electric energy;
   wherein the buoyant installation frame is a buoyant body having a predetermined width comprising a plurality of horizontal frame pieces and a plurality of vertical frame pieces, each piece having buoyant medium filling chambers filled with a predetermined amount of the buoyant medium, the plurality of horizontal frame pieces and the plurality of vertical frame pieces are positioned to cross each other in a horizontal or vertical direction;
   a plurality of flange assembly units, each comprising two flanges closely attached to each other and fixed by a plurality of bolts, each flange assembly unit is configured to connect two horizontal frame pieces to each other, to connect two vertical frame pieces to each other, or to connect a horizontal a piece to a vertical frame piece;
   an air type balance control device installed in each of four corner sides of the buoyant installation frame and configured to control a balance of the buoyant installation frame which is variously changed through an injection and discharge of air, the air type balance control device comprises:
      a balance control chamber separately sealed within each of the four corner sides of the buoyant installation frame;
      an air pressure injection valve configured over the balance control chamber to selectively fill or charge the balance control chamber with air;
      an air discharge valve configured on a side of the balance control chamber to discharge air within the balance control chamber; and
      a water entrance/exit control valve configured under the balance control chamber to receive water corresponding to an amount of air discharged from the balance control chamber to weigh down the balance control chamber, and to discharge water within the balance control chamber in response to a pressure injection of air into the balance control chamber through the air pressure injection valve to lighten the balance control chamber.

2. The water surface floating type high-efficiency waterwheel generator of claim 1, wherein the height adjuster comprises:
   one or more guide poles configured in the buoyant installation frame on both sides of the rotational shaft of the rotational blade unit and configured to lengthily stand at a height of the upper frame;

an up/down slide block configured in a guide pole to slide up and down along the guide pole, the up/down slide block is connected to left and right sides of the rotational shaft;

a screw pole configured to penetrate the up/down slide block 310 from a top surface of the buoyant installation frame to the upper frame;

a rotational direction switching member comprising a screw binding groove engaged with the screw pole and a worm wheel outside the screw binding groove in the upper frame over the screw pole;

a driving shaft comprising a worm gear configured to send and receive a motive power to and from the worm wheel in a direction crossing the rotational direction switching member; and a driving servo motor configured to provide forward and reverse rotation on any one side of the driving shaft.

3. The water surface floating type high-efficiency waterwheel generator of claim 1, further comprising a primary rotation power transfer device and a speed increase device configured between the generator and the rotational shaft, the primary rotation power transfer device comprising:

a spline shaft having a length longer than the height adjuster and configured at a top of the buoyant installation frame at a point at which the spline shaft, supported to upper fixing support plates through a bearing, intersects the rotational shaft;

an up/down moving type helical gear having a spline groove formed therein and engaging the spline shaft, at a point at which the up/down type helical gear intersects the rotational shaft, to move up and down;

a shaft fixing type helical gear engaging the rotational shaft intersecting the up/down moving type helical gear at a tilt angle of 45° and configured to change rotation 90°; and a gear box configured in a circumference of the up/down moving type helical gear and the shaft fixing type helical gear, and supported by bearings to transfer a rotation power of the spline shaft along with up and down movements of the rotational shaft.

4. The water surface floating type high-efficiency waterwheel generator of claim 3, further comprising a secondary rotation power transfer device to transfer the rotation power of the spline shaft to the speed increase device, the secondary rotation power transfer device is configured between the spline shaft rotated by the primary rotation power transfer device and the speed increase device, the secondary rotation power transfer device comprises first and second gears configured in a rotational input-side shaft disposed on a lower side of the speed increase device and the spline shaft, respectively, so that teeth of the first and second gears are engaged with each other.

5. The water surface floating type high-efficiency waterwheel generator of claim 4, further comprising:

a rotational direction automatic conversion device installed on one side of the secondary rotation power transfer device and configured to automatically change a direction in which the rotation power is transferred to a forward rotation or a reverse rotation, the rotational direction automatic conversion device comprises:

a conversion gear configured under the spline shaft into which the first gear of the secondary rotation power transfer device has been inserted;

an idle gear comprising teeth engaged with teeth of the conversion gear; and a gear moving link member disposed in the first gear of the secondary rotation power transfer device and configured to selectively control a transferred rotation direction to the forward rotation or the reverse rotation in response to an engagement of teeth of the gear moving link member with the teeth of the second gear while the gear moving link member operates up and down at a predetermined interval in response to a movement of a water current direction indicator or to an engagement of the teeth of the gear moving link member with the teeth of the idle gear disposed on a lower side of the second gear of the secondary rotation power transfer device; and wherein the water current direction indicator comprises a screw configured to penetrate the water current direction indicator up and down at the back of the gear moving link member, the water current direction indicator, connected to an axis of the screw, is configured to check a direction of the water current while moving in response to a flow of the water current at the bottom of the buoyant installation frame.

6. The water surface floating type high-efficiency waterwheel generator of claim 5, further comprising a driving control unit coupled between the water current direction indicator and the screw by a shaft or a driving motor configured under the screw, the driving control unit is connected to the driving motor and the water current direction indicator by wires.

7. The water surface floating type high-efficiency waterwheel generator of claim 3, further comprising:

a rotational connection gear unit to provide the rotation power to the speed increase device in response to a rotation of the spline shaft by the primary rotation power transfer device and to increase the rotation power at a rotating speed ratio for the generator;

a rotational input-side shaft configured on a lower side of the speed increase device; and herein the speed increase device comprises:

a rotational input gear of a predetermined size configured in the rotational input-side shaft;

a first speed increase gear set installed on one side of the rotational input gear and comprising a first passive gear having teeth engaged with teeth of the rotational input gear and a first middle gear larger than the first passive gear, the first passive and first middle gears are inserted into a first passive shaft up and down;

a second speed increase gear set installed on one side of the first speed increase gear set and comprising a second passive gear having teeth engaged with teeth of the first middle gear and a second middle gear larger than the second passive gear, the second passive and second middle gears are inserted into a second passive shaft up and down;

a third speed increase gear set installed on one side of the second speed increase gear set and comprising a third passive gear having teeth engaged with teeth of the second middle large gear and a third middle gear larger than the third passive gear, the third passive and third middle gears are inserted into a third passive shaft up and down; and a speed increase output shaft comprising an output gear smaller than the third middle gear and provided on one side at a back of the third speed increase gear set.

8. The water surface floating type high-efficiency waterwheel generator of claim 7, further comprising a motive power rear transfer device installed between a top of the rotational input-side shaft and a top of the speed increase output shaft, and configured to overcome a movement inhibited by a load applied in response due to increasing speed and resistance thereof, the motive power rear transfer device comprises a rotational start-side pulley configured at the top of the rotational input-side shaft, a speed increase load-side pulley configured at the top of the speed increase output shaft, and a tackle bearing installed in a bicycle pedal wheel and inserted into the speed increase load-side pulley.

9. The water surface floating type high-efficiency waterwheel generator of claim 1, further comprising:
  wires of a predetermined length densely wound on a rotary drum at the top of the buoyant installation frame;
  a deceleration motor configured on one side of the rotary drum; and
  a plurality of circular floats configured to pull a plurality of bodies using the wires.

10. The water surface floating type high-efficiency waterwheel generator of claim 1, further comprising a wind power generator configured to provide a reserved power using the wind and installed at the top of the upper frame in which the rotational blade unit has been embedded.

11. A water surface floating type high-efficiency waterwheel generator, comprising:
  a buoyant installation frame filled with a predetermined amount of a buoyant medium of a predetermined buoyancy operation on the water such that the buoyant installation frame floats on the water;
  waterwheel installation grooves perforated in any one or more points of the buoyant installation frame and exposed to a water current;
  a waterwheel type rotational blade unit installed in the waterwheel installation grooves and comprising a plurality of rotational blades attached around a rotational shaft;
  a height adjuster installed between upper frames placed at a predetermined height on both sides of the rotational blade unit and configured to control top and bottom heights of the rotational blade unit;
  a wire hooking device, a wire and a fixing anchor, installed in an outer circumference of the buoyant installation frame, at a bottom surface under a surface of the water, and between the outer circumference and the bottom surface, are configured to hold the buoyant installation frame to prevent the buoyant installation frame from being carried away by the water current;
  a generator installed on one side of the rotational shaft and configured to receive a rotation power of the rotational blade unit rotated by the water current and to convert the rotation power into an electric energy;
  wherein the buoyant installation frame is a buoyant body having a predetermined width comprising a plurality of horizontal frame pieces and a plurality of vertical frame pieces, each piece having buoyant medium filling chambers filled with a predetermined amount of the buoyant medium, the plurality of horizontal frame pieces and the plurality of vertical frame pieces are positioned to cross each other in a horizontal or vertical direction; and
  a plurality of flange assembly units, each comprising two flanges closely attached to each other and fixed by a plurality of bolts, each flange assembly unit is configured to connect two horizontal frame pieces to each other, to connect two vertical frame pieces to each other, or to connect a horizontal a piece to a vertical frame piece;
  a primary rotation power transfer device and a speed increase device configured between the generator and the rotational shaft, the primary rotation power transfer device comprising:
  a spline shaft having a length longer than the height adjuster and configured at a top of the buoyant installation frame at a point at which the spline shaft, supported to upper fixing support plates through a bearing, intersects the rotational shaft;
  an up/down moving type helical gear having a spline groove formed therein and engaging the spline shaft, at a point at which the up/down type helical gear intersects the rotational shaft, to move up and down;
  a shaft fixing type helical gear engaging the rotational shaft intersecting the up/down moving type helical gear at a tilt angle of 45° and configured to change rotation 90<;
  a gear box configured in a circumference of the up/down moving type helical gear and the shaft fixing type helical gear, and supported by bearings to transfer a rotation power of the spline shaft along with up and down movements of the rotational shaft;
  a rotational connection gear unit to provide the rotation power to the speed increase device in response to a rotation of the spline shaft by the primary rotation power transfer device and to increase the rotation power at a rotating speed ratio for the generator;
  a rotational input-side shaft configured on a lower side of the speed increase device; and
  wherein the speed increase device comprises:
    a rotational input gear of a predetermined size configured in the rotational input-side shaft;
    a first speed increase gear set installed on one side of the rotational input gear and comprising a first passive gear having teeth engaged with teeth of the rotational input gear and a first middle gear larger than the first passive gear, the first passive and first middle gears are inserted into a first passive shaft up and down;
    a second speed increase gear set installed on one side of the first speed increase gear set and comprising a second passive gear having teeth engaged with teeth of the first middle gear and a second middle gear larger than the second passive gear, the second passive and second middle gears are inserted into a second passive shaft up and down;
    a third speed increase gear set installed on one side of the second speed increase gear set and comprising a third passive gear having teeth engaged with teeth of the second middle large gear and a third middle gear larger than the third passive gear, the third passive and third middle gears are inserted into a third passive shaft up and down; and
    a speed increase output shaft comprising an output gear smaller than the third middle gear and provided on one side at a back of the third speed increase gear set.

12. The water surface floating type high-efficiency waterwheel generator of claim 11, further comprising:
  an air type balance control device installed in each of four corner sides of the buoyant installation frame and configured to control a balance of the buoyant installation frame which is variously changed through an injection and discharge of air, the air type balance control device comprises:
    a balance control chamber separately sealed within each of the four corner sides of the buoyant installation frame;

an air pressure injection valve configured over the balance control chamber to selectively fill or charge the balance control chamber with air;

an air discharge valve configured on a side of the balance control chamber to discharge air within the balance control chamber; and a water entrance/exit control valve configured under the balance control chamber to receive water corresponding to an amount of air discharged from the balance control chamber to weigh down the balance control chamber, and to discharge water within the balance control chamber in response to a pressure injection of air into the balance control chamber through the air pressure injection valve to lighten the balance control chamber.

13. The water surface floating type high-efficiency waterwheel generator of claim 11, further comprising a motive power rear transfer device installed between a top of the rotational input-side shaft and a top of the speed increase output shaft, and configured to overcome a movement inhibited by a load applied in response due to increasing speed and resistance thereof, the motive power rear transfer device comprises a rotational start-side pulley configured at the top of the rotational input-side shaft, a speed increase load-side pulley configured at the top of the speed increase output shaft, and a tackle bearing installed in a bicycle pedal wheel and inserted into the speed increase load-side pulley.

14. The water surface floating type high-efficiency waterwheel generator of claim 11, wherein the height adjuster comprises:
   one or more guide poles configured in the buoyant installation frame on both sides of the rotational shaft of the rotational blade unit and configured to lengthily stand at a height of the upper frame;
   an up/down slide block configured in a guide pole to slide up and down along the guide pole, the up/down slide block is connected to left and right sides of the rotational shaft;
   a screw pole configured to penetrate the up/down slide block 310 from a top surface of the buoyant installation frame to the upper frame;
   a rotational direction switching member comprising a screw binding groove engaged with the screw pole and a worm wheel outside the screw binding groove in the upper frame over the screw pole;
   a driving shaft, comprising a worm gear configured to send and receive a motive power to and from the worm wheel in a direction crossing the rotational direction switching member; and
   a driving servo motor configured to provide forward and reverse rotation on any one side of the driving shaft.

15. The water surface floating type high-efficiency waterwheel generator of claim 11, further comprising a secondary rotation power transfer device to transfer the rotation power of the spline shaft to the speed increase device, the secondary rotation power transfer device is configured between the spline shaft rotated by the primary rotation power transfer device and the speed increase device, the secondary rotation power transfer device comprises first and second gears configured in a rotational input-side shaft disposed on a lower side of the speed increase device and the spline shaft, respectively, so that teeth of the first and second gears are engaged with each other.

16. The water surface floating type high-efficiency waterwheel generator of claim 15, further comprising:
   a rotational direction automatic conversion device installed on one side of the secondary rotation power transfer device and configured to automatically change a direction in which the rotation power is transferred to a forward rotation or a reverse rotation, the rotational direction automatic conversion device comprises:
      a conversion gear configured under the spline shaft into which the first gear of the secondary rotation power transfer device has been inserted;
      an idle gear comprising teeth engaged with teeth of the conversion gear; and
      a gear moving link member disposed in the first gear of the secondary rotation power transfer device and configured to selectively control a transferred rotation direction to the forward rotation or the reverse rotation in response to an engagement of teeth of the gear moving link member with the teeth of the second gear while the gear moving link member operates up and down at a predetermined interval in response to a movement of a water current direction indicator or to an engagement of the teeth of the gear moving link member with the teeth of the idle gear disposed on a lower side of the second gear of the secondary rotation power transfer device; and
   wherein the water current direction indicator comprises a screw configured to penetrate the water current direction indicator up and down at the back of the gear moving link member, the water current direction indicator, connected to an axis of the screw, is configured to check a direction of the water current while moving in response to a flow of the water current at the bottom of the buoyant installation frame.

17. The water surface floating type high-efficiency waterwheel generator of claim 16, further comprising a driving control unit coupled between the water current direction indicator and the screw by a shaft or a driving motor configured under the screw, the driving control unit is connected to the driving motor and the water current direction indicator by wires.

18. The water surface floating type high-efficiency waterwheel generator of claim 11, further comprising:
   wires of a predetermined length densely wound on a rotary drum at the top of the buoyant installation frame;
   a deceleration motor configured on one side of the rotary drum; and
   a plurality of circular floats configured to pull a plurality of bodies using the wires.

19. The water surface floating type high-efficiency waterwheel generator of claim 11, further comprising a wind power generator configured to provide a reserved power using the wind and installed at the top of the upper frame in which the rotational blade unit has been embedded.

* * * * *